(12) United States Patent
Tigerstedt et al.

(10) Patent No.: US 7,085,570 B2
(45) Date of Patent: Aug. 1, 2006

(54) HANDOVER METHOD, SYSTEM AND RADIO NETWORK CONTROLLER

(75) Inventors: Karl Tigerstedt, Espoo (FI); Uwe Schwarz, Viekkola (FI); Harri Holma, Helsinki (FI); Atte Artamo, Espoo (FI); Pauli Aikio, Helsinki (FI); Pekka J. Ranta, Espoo (FI); Terhi Rautiainen, Helsinki (FI); Siamäk Naghian, Espoo (FI); Risto Aalto, Riihimäki (FI)

(73) Assignee: Nokia Corporation, Espoo (FI)

( * ) Notice: Subject to any disclaimer, the term of this patent is extended or adjusted under 35 U.S.C. 154(b) by 248 days.

(21) Appl. No.: 10/326,281

(22) Filed: Dec. 23, 2002

(65) Prior Publication Data

US 2004/0121770 A1 Jun. 24, 2004

(51) Int. Cl.
*H04Q 7/20* (2006.01)

(52) U.S. Cl. .................. 455/439; 455/440; 370/331
(58) Field of Classification Search ........ 455/436–445; 370/328–335, 342
See application file for complete search history.

(56) References Cited

U.S. PATENT DOCUMENTS

| 5,267,261 | A | * | 11/1993 | Blakeney et al. | ........... 370/332 |
| 5,530,910 | A | * | 6/1996 | Taketsugu | .................. 455/444 |
| 5,557,657 | A | * | 9/1996 | Barnett | ........................ 455/444 |
| 5,697,055 | A | * | 12/1997 | Gilhousen et al. | ......... 455/436 |
| 5,960,347 | A | * | 9/1999 | Ozluturk | ..................... 455/442 |
| 6,061,337 | A | * | 5/2000 | Light et al. | ................. 370/331 |
| 6,112,089 | A | * | 8/2000 | Satarasinghe | ............... 455/437 |
| 6,119,005 | A | * | 9/2000 | Smolik | ....................... 455/436 |
| 6,195,342 | B1 | * | 2/2001 | Rohani | ....................... 370/331 |
| 6,212,382 | B1 | * | 4/2001 | Watson et al. | .............. 455/444 |
| 6,289,220 | B1 | * | 9/2001 | Spear | .......................... 455/436 |
| 6,334,052 | B1 | * | 12/2001 | Nordstrand | ................. 455/411 |
| 6,360,100 | B1 | * | 3/2002 | Grob et al. | ................. 455/442 |
| 6,405,043 | B1 | * | 6/2002 | Jensen et al. | ............... 455/446 |
| 6,496,493 | B1 | * | 12/2002 | Chung | ........................ 370/332 |

* cited by examiner

*Primary Examiner*—Charles N. Appiah
(74) *Attorney, Agent, or Firm*—Squire, Sanders & Dempsey LLP

(57) ABSTRACT

A handover method in a telecommunication system, the method comprising: clarifying whether a mobile station is in a dual coverage area, and, if the mobile station is in a dual coverage area, making the decision to make a handover from a cell of one radio system to a cell of another radio system and performing the handover.

20 Claims, 4 Drawing Sheets

HANDOVER METHOD, SYSTEM AND RADIO NETWORK CONTROLLER

BACKGROUND OF THE INVENTION

1. Field of the Invention

The invention relates to a handover method, a system and a radio network controller.

2. Description of the Related Art

In cellular radio systems, radio coverage is achieved by radio cells, which typically have radiuses from tens of meters to a few kilometers. When a user moves from one cell to another, mobile equipment has to change to the radio frequency that is allocated to it in the new cell. This changing process is called a handover.

In WCDMA systems (Wide Band Code Division Multiple Access), like UMTS (Universal Mobile Telecommunication System), there are several different types of handovers, such as Intra-frequency handovers, Inter-frequency handovers and inter-system handovers. For performing a successful handover, user equipment has to make measurements to find out whether the signal of a base station (or B-node) to which it is connected is strong enough or would there possibly be a stronger signal in another cell.

Many of these measurements are made in a compressed mode (CM). The compressed mode means that transmission and reception are interrupted for a short period of time, typically for a few milliseconds, in order to perform measurements on the other frequencies. The data is thus compressed in the time domain. Frame compression can be done by lowering the data rate from higher layers, increasing the data rate by changing the spreading factor or reducing the symbol rate by puncturing.

The problem is that the compressed mode measurements cause quite a heavy load to a network and waste resources. The compressed mode measurements have the most noticeable effect on link performance if the terminal is at the cell edge.

SUMMARY OF THE INVENTION

It is an object of the invention to provide an improved method, a system and a radio network controller for performing handovers. This is achieved by a handover method in a telecommunication system. The method comprising the steps of storing information on the previous successful handovers of a desired geographical area, maintaining the data of the radio cells available in a desired geographical area, maintaining the data of the radio cells available to user equipment, comparing the data of the radio cells available in the desired geographical area with the data of the radio cells available to the user equipment, selecting the most suitable target cell for a handover on the basis of the results of the comparison between the data of the radio cells available in the desired geographical area and the data of the radio cells available to the user equipment and the information on the previous successful handovers, performing a handover.

The invention also relates to a handover method in a telecommunication system. The method comprising the steps of maintaining the data of the radio cells available in a desired geographical area, maintaining the data of the radio cells available to user equipment, comparing the data of the radio cells available in the desired geographical area with the data of the radio cells available to the user equipment, and if a cell belonging to a radio system different from the user equipment's current connection system and which cell the user equipment can hear is found, performing a handover.

The invention also relates to a handover method in a telecommunication system. The method comprising the steps of clarifying whether a mobile station is in a dual coverage area, and, if the mobile station is in a dual coverage area, making the decision to perform a handover from a cell of one radio system to a cell of another radio system, performing the handover.

The invention further relates to a handover method in a telecommunication system. The method comprising the steps of storing information on the previous successful handovers of a determined geographical area, acquiring and storing the data of the radio cells obtainable in the determined geographical area, acquiring and storing the data of the radio cells obtainable to user equipment, comparing the data of the radio cells obtainable in the determined geographical area with the data of the radio cells obtainable to the user equipment and selecting the most suitable target cell for a handover on the basis of the results of the comparison and the stored information on the previous successful handovers, performing a handover.

The system of the invention comprises means for storing information on the previous successful handovers of a desired geographical area, means for maintaining the data of the radio cells available in a desired geographical area, means for maintaining the data of the radio cells available to user equipment, means for comparing the data of the radio cells available in the desired geographical area with the data of the radio cells available to the user equipment, means for selecting the most suitable target cell for a handover on the basis of the results of the comparison between the data of the radio cells available in the desired geographical area and the data of the radio cells available to the user equipment and the information on the previous successful handovers, means for performing a handover.

The system of the invention comprises means for maintaining the data of the radio cells available in a desired geographical area, means for maintaining the data of the radio cells available to user equipment, means for comparing the data of the radio cells available in the desired geographical area with the data of the radio cells available to the user equipment, means for performing a handover.

The system of the invention comprises means for clarifying whether a mobile station is in a dual coverage area, and, if the mobile station is in a dual coverage area, means for making a decision to make a handover from a cell of one radio system to a cell of another radio system, means for performing the handover.

The system of the invention comprises means for storing information on the previous successful handovers of a determined geographical area, means for acquiring and storing the data of the radio cells obtainable in a determined geographical area, means for acquiring and storing the data of the radio cells obtainable to user equipment, means for comparing the data of the radio cells obtainable in the determined geographical area with the data of the radio cells obtainable to the user equipment and for selecting the most suitable target cell for a handover on the basis of the results of the comparison and the stored information on the previous successful handovers, means for performing a handover.

The telecommunication system of the invention is configured to store information on the previous successful handovers of a desired geographical area, maintain the data of the radio cells available in the desired geographical area, maintain the data of the radio cells available to user equipment, compare the data of the radio cells available in the desired geographical area with the data of the radio cells available to the user equipment, select the most suitable target cell for a handover on the basis of the results of the comparison between the data of the radio cells available in the desired geographical area and the data of the radio cells available to the user equipment and the information on the previous successful handovers, perform a handover.

The telecommunication system of the invention is configured to maintain the data of the radio cells available in a desired geographical area, maintain the data of the radio cells available to user equipment, compare the data of the radio cells available in the desired geographical area with the data of the radio cells available to the user equipment, perform a handover.

The telecommunication system of the invention is configured to clarify whether a mobile station is in a dual coverage area, and, if the mobile station is in a dual coverage area, perform a handover from a cell of one radio system to a cell of another radio system, perform the handover.

The telecommunication system of the invention is configured to store information on the previous successful handovers of a determined geographical area, acquire and store the data of the radio cells obtainable in the determined geographical area, acquire and store the data of the radio cells obtainable to user equipment, compare the data of the radio cells obtainable in the determined geographical area with the data of the radio cells obtainable to the user equipment and to select the most suitable target cell for a handover on the basis of the results of the comparison and the stored information on the previous successful handovers, perform a handover.

The radio network controller of the invention comprises means for storing information on the previous successful handovers of a desired geographical area, means for maintaining the data of the radio cells available in the desired geographical area, means for receiving the data of the radio cells available to user equipment, means for comparing the data of the radio cells available in the desired geographical area with the data of the radio cells available to the user equipment, means for selecting the most suitable target cell for a handover on the basis of the results of the comparison between the data of the radio cells available in the desired geographical area and the data of the radio cells available to the user equipment and the information on the previous successful handovers, means for commanding the user equipment to perform a handover.

The radio network controller of the invention comprises means for clarifying whether a mobile station is in a dual coverage area, and, if the mobile station is in a dual coverage area, means for making a decision to perform a handover from a cell of one radio system to a cell of another radio system, means for commanding the user equipment to perform a handover.

Preferred embodiments of the invention are disclosed in the dependent claims.

The method and system of the invention provide several advantages. In a preferred embodiment of the invention, a handover can be made with fewer or even without compressed mode measurements, thus saving resources.

BRIEF DESCRIPTION OF THE DRAWINGS

In the following, the invention will be described in greater detail with reference to the preferred embodiments and the accompanying drawings, in which.

DETAILED DESCRIPTION OF THE PREFERRED EMBODIMENTS

Figure 1:
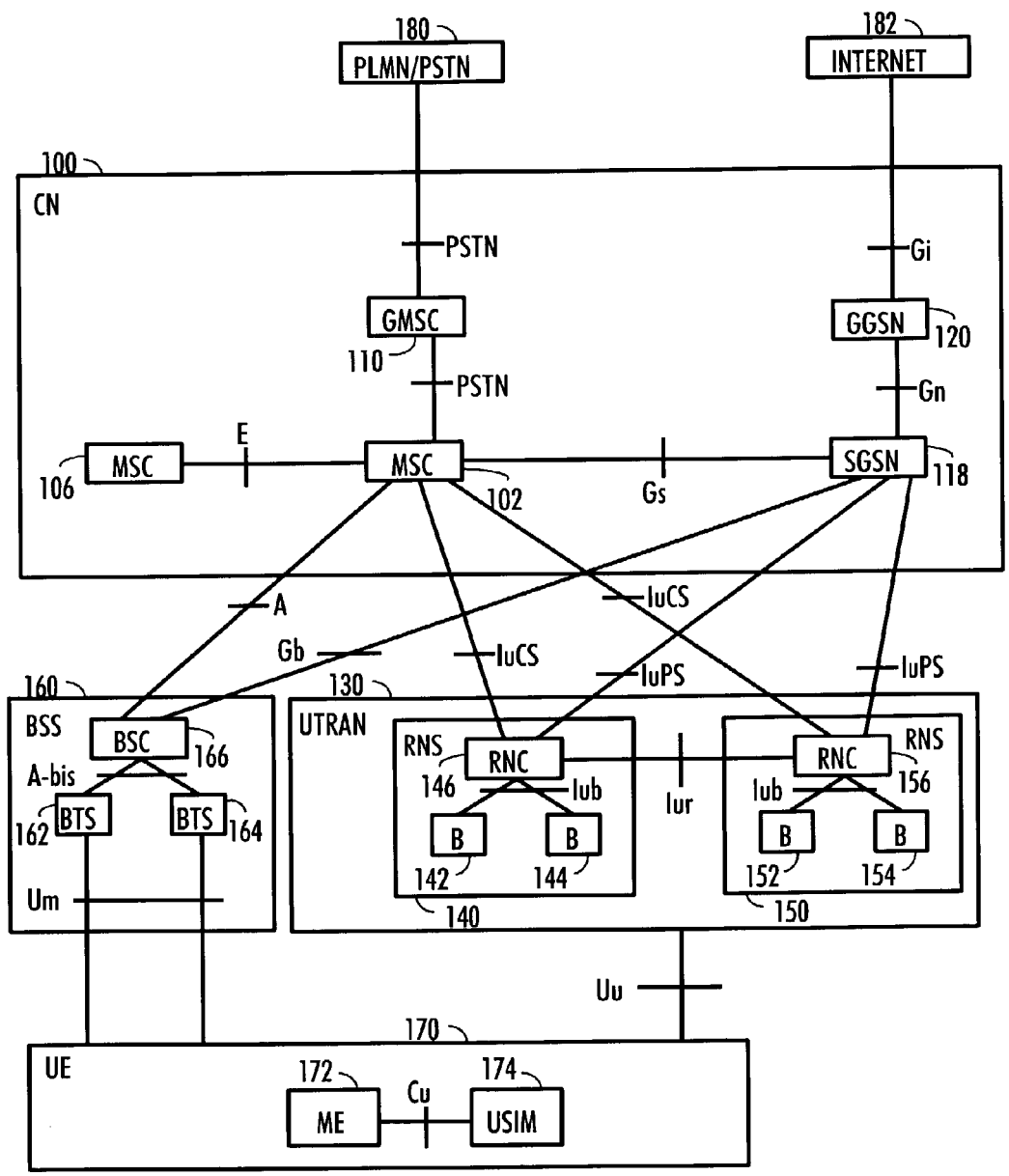
FIG. 1 shows an example of a data transmission system.

Since the radio systems of the second and the third generation and their various hybrids, i.e. radio systems of the 2.5 generation, are in use worldwide and under constant development, in FIG. 1 the embodiments are described in a simplified radio system that comprises network elements from different generations in parallel. In the description, the radio system of the second generation is represented by GSM (Global System for Mobile Communications), the third-generation radio system by a radio system which is based on GSM, uses the EDGE technique (Enhanced Data Rates for Global Evolution) for increasing the data transmission rate, and can also be used for implementing packet transmission in the GPRS system (General Packet Radio System). The third-generation radio system is also represented by a radio system which is known at least by the names IMT-2000 (International Mobile Telecommunications 2000) and UMTS (Universal Mobile Telecommunications System). The embodiments are not, however, restricted to these systems given as examples but a person skilled in the art may apply the solution to other radio systems provided with the necessary properties.

FIG. 1 is a simplified block diagram which describes the most important network elements of the radio system and the interfaces between them. The structure and function of the network elements are not described in detail because they are generally known. The main parts of the radio system are a core network (CN) 100, a radio access network 130 and user equipment (UE) 170. The term UTRAN is an abbreviation from UMTS Terrestrial Radio Access Network, i.e. the radio access network belongs to the third generation and is implemented by wide-band code division multiple access WCDMA. FIG. 1 further illustrates a base station system 160 which belongs to the 2/2.5 generation and is implemented by time division multiple access TDMA.

Generally, the radio system can also be defined as follows: the radio system consists of a user terminal, which is also called a subscriber terminal or a mobile station, and of a network part, which includes the fixed infrastructure of the radio system, i.e. a core network, a radio access network and a base station system.

The structure of the core network 100 corresponds to a combined structure of the GSM and GPRS systems. The network elements of GSM are responsible for implementing circuit-switched connections and the network elements of GPRS are responsible for implementing packet-switched connections. However, some of the network elements are included in both systems.

A mobile services switching center (MSC) 102 is the center of the circuit-switched side of the core network 100. The same mobile services switching center 102 can be used to serve the connections of both the radio access network 130 and the base station system 160. The tasks of the mobile services switching center 102 typically include switching, paging, user terminal location registration, handover management, collection of subscriber billing information, data encryption parameter management, frequency allocation management, and echo cancellation.

The number of mobile services switching centers 102 may vary: a small network operator may have only one mobile services switching center 102, whereas large core networks 100 may have several. FIG. 1 shows an other mobile services switching center 106 but its connections to other network elements are not illustrated to keep FIG. 1 sufficiently clear.

Large core networks 100 may comprise a separate gateway mobile services switching center (GMSC) 110, which is responsible for circuit-switched connections between the core network 100 and the external networks 180. The gateway mobile services switching center 110 is located between the mobile services switching centers 102, 106 and the external networks 180. The external network 180 may be, for example, a public land mobile network PLMN or a public switched telephone network PSTN. The core network 100 typically comprises other parts, too, such as a home location register HLR, which in cludes a permanent subscriber register and, if the radio system supports GPRS, a PDP address (PDP=Packet Data Protocol), and a visitor location register VLR, which includes information on the roaming of the user terminals 170 in the area of the mobile services switching center 102. Not all parts of the core network are shown in FIG. 1 to keep it clear.

A serving GPRS support node (SGSN) 118 is the center of the packet-switched side of the core network 100. The main task of the serving GPRS support node 118 is to transmit packets to and receive them from the user terminal 170 supporting packet-switched transmission, utilizing the radio access network 130 or the base station system 160. The serving GPRS support node 118 includes user information and location information on the user terminal 170. A gateway GPRS support node (GGSN) 120 on the packet-switched side corresponds to the gateway mobile services switching center 110 of the circuit-switched side, with the exception that the gateway GPRS support node 120 has to be able to route outgoing traffic from the core network 100 to external networks 182, whereas the gateway mobile services switching center 110 routes only the incoming traffic. In the example, the external networks 182 are represented by the Internet, via which a considerable part of wireless telephone traffic can be transmitted in the future.

The base station system 160 consists of a base station controller (BSC) 166 and base transceiver stations (BTS) 162, 164. The base station controller 166 controls the base transceiver stations 162, 164. In principle, the devices implementing the radio path and their functions should be located in the base transceiver station 162, 164, and the management devices in the base station controller 166. The implementation may naturally deviate from this principle.

The base station controller 166 is usually responsible for the following tasks, for example: management of the radio resources of the base transceiver station 162, 164, intercell handover, frequency management, i.e. allocation of frequencies to the base transceiver stations 162, 164, management of frequency hopping sequences, measurement of time delays on the uplink, implementation of the operation and management interface, and management of power control.

The base station controller may also comprise a serving mobile location center (SMLC) which carriers out user equipment positioning. The SMLC selects a positioning method, control positioning measurements and calculate the position of the target. The serving mobile location center can also be situated in other network elements or it can be a dedicated physical network element.

The base station 162, 164 includes at least one transceiver which forms one carrier wave. In the GSM systems, one carrier wave usually comprises eight time slots, i.e. eight physical channels. One base station 162, 164 may serve one cell or several sectorized cells. The cell diameter may vary from a few meters to dozens of kilometers. The base station 162, 164 is often deemed to include a transcoder, too, for performing conversion between the speech coding format used in the radio system and the speech coding format used in the public switched telephone system. In practice the transcoder, however, is usually located in the mobile services switching center 102. The base station 162, 164 is usually responsible for the following tasks, for example: calculation of TA (timing advance), measurements on the uplink, channel coding, encryption of coding, decryption, and frequency hopping.

The radio access network 130 consists of radio network subsystems 140, 150. Each radio network subsystem 140, 150 consists of radio network controllers (RNC) 146, 156 and B nodes 142, 144, 152, 154. The B node is rather an abstract concept and it is frequently replaced by the term 'base station'. In respect of its functionality, the radio network controller 140, 150 approximately corresponds to the base station controller 166 of the GSM system, and the B node 142, 144, 152, 154 to the base station 162, 164 of the GSM system. Solutions are also available where the same device functions both as the base station and as the B node, i.e. the device can simultaneously implement the TDMA and the WCDMA radio interface. The radio network controller is typically connected to base stations (or B nodes) by a radio link or a cable. If the connection is a radio link, the radio network controller comprises a radio receiver and a transmitter or is connected to them.

The user terminal 170 consists of two parts: mobile equipment (ME) 172 and a UMTS subscriber identity module (USIM) 174. In the GSM system, the identity module of the system is naturally used. The user terminal 170 comprises at least one transceiver for establishing a radio connection to the radio access network 130 or to the base station system 160. The user terminal 170 may include at least two different subscriber identity modules. In addition, the user terminal 170 comprises an antenna, a user interface and a battery. Nowadays various kinds of user terminals 170 are available, e.g. terminals that are installed in a car and portable terminals. The user terminals 170 also have properties similar to those of a personal computer or a portable computer.

USIM 174 includes information on the user and, in particular, information on data security, e.g. an encryption algorithm. In the following, the interfaces between different network elements shown in FIG. 1 are presented in Table 1. It is obvious to a person skilled in the art that the interfaces included in the radio telecommunications system are determined by the hardware implementation and the standard used, for which reason the interfaces of the system may differ from those shown in FIG. 1. In UMTS, the most important interfaces are the Iu interface between the core network and the radio access network, which is divided into the IuCS (CS=Circuit Switched) interface of the circuit-switched side and the IuPS (PS=Packet Switched) interface of the packet-switched side, and the Uu interface between the radio access network and the user terminal. In GSM, the most important interfaces are the A interface between the base station controller and the mobile services switching center, the Gb interface between the base station controller and the serving GPRS support node, and the Um interface between the base station and the user terminal. The interface defines what kind of messages different network elements may use to communicate with one another. The object of the standardization of interfaces is to enable operation between network elements of different producers. In practice, however, some of the interfaces are producer-specific.

| Interface | Between network elements |
|-----------|--------------------------|
| Uu | UE-UTRAN |
| Iu | UTRAN-CN |
| IuCs | UTRAN-MSC |
| IuPS | UTRAN-SGSN |
| Cu | ME-USIM |
| Iur | RNC-RNC |
| Iub | RNC-B |
| A | BSS-MSC |
| Gb | BSC-SGSN |
| A-bis | BSC-BTS |
| Um | BTS-UE |
| E | MSC-MSC |
| Gs | MSC-SGSN |
| PSTN | MSC-GMSC |
| PSTN | GMSC-PLMN/PSTN |
| Gn | SGSN-GGSN |
| Gi | GGSN-INTERNET |

Figure 2:
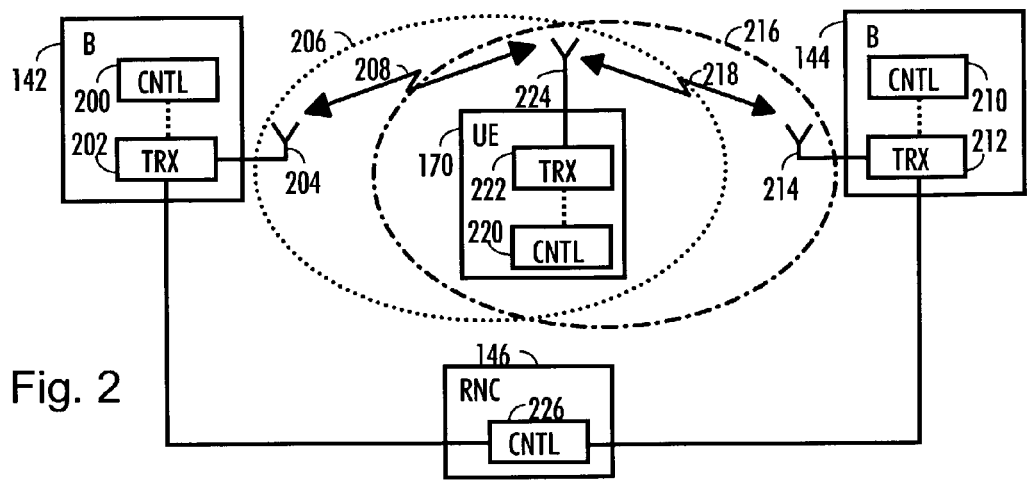
FIG. 2 shows another example of a data transmission system.

In the following, a cellular WCDMA radio telecommunications system will be described by means of FIG. 2. FIG. 2 shows a part of a simplified radio system that comprises a subscriber terminal 170, two base stations 142, 144 and a base station controller 146. The first base station 142 comprises a transceiver 202, an antenna 204 and a control block 200. Likewise, the second base station 144 comprises a transceiver 212, an antenna 214 and a control block 210. The base station controller 146 also comprises a control block 226. The user terminal 170 also comprises a normal transceiver 222 and an antenna for establishing a radio connection and a control block 220. The transceivers 202, 212, 222 use the CDMA technology (Code Division Multiple Access). In the CDMA technology, i.e. in code division multiple access, radio resources are allocated to each user by means of user-specific codes. The technique is generally known, for which reason it will not be described in greater detail here. The antennas 204, 214, 224 can be implemented by common prior-art solutions, e.g. as omnidirectional antennas or as antennas employing a directed antenna beam. In the radio telecommunications system, the radio cells created by base stations usually overlap to some extent to provide extensive coverage. This is illustrated in FIG. 2 by a radio cell 206 created by the base station 142 and a radio cell 216 created by the base station 144. In the existing radio telecommunications systems, wireless telecommunications connections are established by user terminals and base stations which communicate with one another on a radio connection, i.e. calls or data transmission connections between different user terminals are established via base stations. This is illustrated in FIG. 2 by radio connections 208, 218. In particular, FIG. 2 shows a situation where a user terminal 170, which may be mobile, communicates over a radio connection with the first base station 142, simultaneously measuring common pilots of this base station 142 and the second base station 144 for a possible handover. In a typical situation, the radio connection of the user terminal shifts to the carrier wave of the second base station when there is free capacity in the new cell and the new connection has a better quality. Channel and cell handovers enable continuity of the radio connection when the user terminal moves or the physical radio channel changes as a function of time. The control blocks 200, 210, 220, 226 refer to a block which controls the function of the device and which is nowadays usually implemented as a processor and its software, but various hardware solutions are also feasible, e.g. a circuit built from logic components or one or more application-specific integrated circuits ASIC. A hybrid of these different implementations is also feasible. When selecting the implementation method, a person skilled in the art will consider the requirements set on the size and power consumption of the device, the necessary processing capacity, the production costs and the production volumes.

Further information on radio telecommunications systems is avail-able in the literature and standards of the field.

Figure 3:
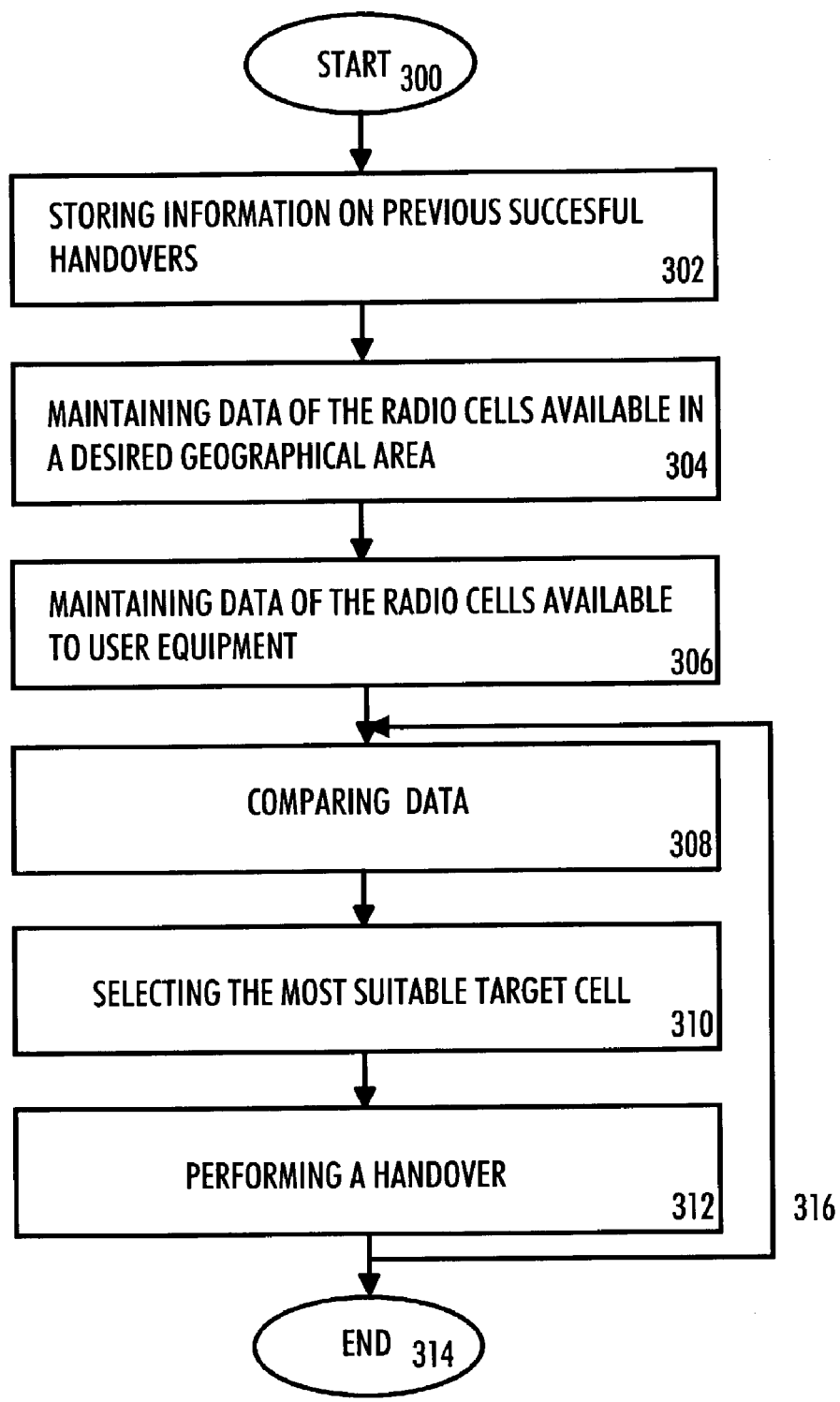
FIG. 3 is a flow chart.

Referring to FIG. 3, a preferred embodiment of the method to perform a handover in a radio telecommunication system without current compressed mode measurements will now be explained. The handover, which is made without the current compressed mode measurements, is usually called a blind handover. A basic handover process comprises three main phases called a measurement phase, decision phase and execution phase. The measurement phase in compressed mode requires a great deal of resources from both the mobile station and network, and therefore, it is beneficial to avoid these measurements.

There are many reasons for a handover. The basic reason behind a handover is that the air interface connection no longer fulfils the criteria set for it. The most typical criteria for a handover are for instance signal quality, user mobility and traffic distribution. A signal quality handover is made when the quality of the radio signal deteriorates below parameters defined in the radio network controller. The deterioration is detected by the signal measurements carried out by mobile stations or base stations.

A traffic distribution handover occurs when the traffic capacity of a cell has reached the maximum or is approaching it. In that situation, a mobile station near the edge of the cell with a high load may be transferred to a neighboring cell with a smaller load.

The compressed mode measurements and data compression are described in more detail in the following. The compressed mode means that transmission and reception are discontinued for a predetermined period of time, usually for a few milliseconds, when a WDCMA frame lasts for 10 milliseconds, in order to perform measurements on the other frequencies. In the compressed mode, transmission only exists in 8 slots per one frame, whereas a normal-mode transmission uses 15 slots per a frame. The data is thus compressed in the time domain. Frame compression can be achieved by several methods. One method is that the data rate from the higher layers is reduced. This requires that higher layers have knowledge of the compressed mode schedule of the terminal. Another method is that the data rate is raised by changing the spreading factor. Yet another method is reducing the symbol rate by puncturing at the physical layer multiplexing chain. Puncturing has, however, some limitations in practice and, therefore, it does not suit all circumstances.

The task of the compressed mode measurements is to find out, for instance, the signal-to-noise ratio.

This method is especially well suited for situations in which WCDMA coverage ends and GSM coverage starts. These situations occur quite often, especially when a mobile station is leaving an urban area and arriving at the countryside.

The method starts in block 300. In block 302, information on the previous successful handovers of a desired geographical area is stored preferably in a radio network controller.

When the mobile station is moving along a densely used traffic route, it is possible to use the information on the previous successful handovers, because mobile stations on the same route typically make handovers from the same old cell to the same new cell. In consequence of that, it is not necessary that all the mobile stations using the same route make the compressed mode measurements themselves. It is quite likely that mobile stations in the same cell and, with predetermined accuracy, in the same location, get sufficiently similar measurement results. The information on the previous successful handovers can be stored into a table in the radio network controller, for instance.

In block 304, the data of the radio cells available in a desired geographical area is maintained. This can be done, for example, by utilizing a neighbor set. The neighbor set is a list of cells the mobile station continuously measures or listens to, but whose pilot signals do not have adequate signal-to-noise ratios. This list is typically kept in the radio network controller. The mobile station makes measurements and signals the results to the base station, which then forwards them to the radio network controller. There are also other possibilities to gather and store this information.

Next, the data of the radio cells obtainable to user equipment (meaning typically a mobile station) is maintained in 306. The data of the radio cells can be stored into an active set. The active set is a list of cells whose pilot signals do not have strong enough signal-to-noise ratios for the mobile station to perform a handover to. An active set is typically stored in the mobile station. Or, alternatively, there can be two lists: an active set containing the cells that are currently used for soft handovers, and a candidate list containing the cells that can be used for soft handovers, but are not used at the moment. There are also other possibilities to gather and store this information.

Usually, if a pilot signal of a cell in a neighbor list becomes strong enough, it will be added to the active list, and vice versa.

The data of the radio cells available in the desired geographical area and the data of the radio cells available to the user equipment are compared in block 308. The target is to find the neighbor set that contains as many same cells as possible in comparison with the active set in question.

In block 310, the most suitable target cell for a handover is selected on the basis of the results of the comparison between the data of the radio cells available in the desired geographical area and the data of the radio cells available to the user equipment and the information on the previous successful handovers.

Figure 5:
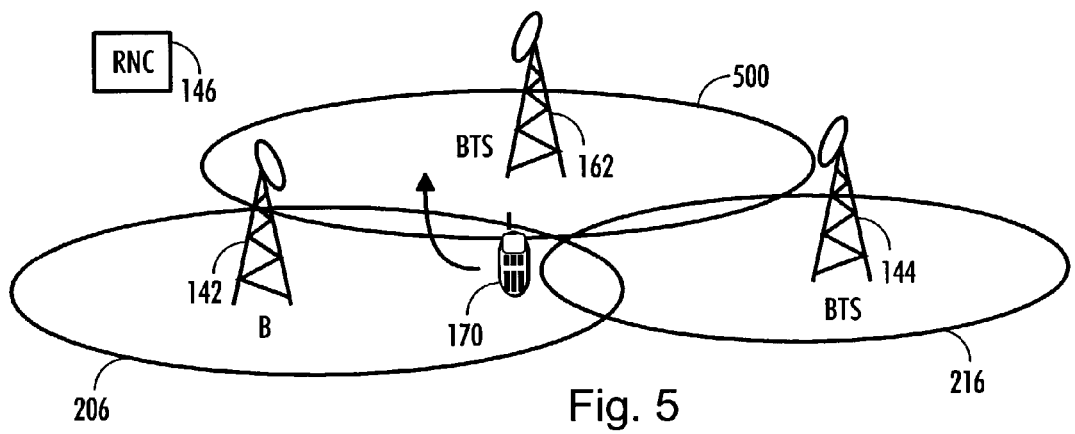
FIG. 5 illustrates an example of a handover situation.

Next, an example of one handover situation will be explained in more detail. FIG. 5 shows a simplified example of the parts of a cellular network. For example, the sizes and the number of radio cells may naturally differ from FIG. 5. The cell with reference number 500 is a GSM cell and cells with reference numbers 206 and 216 are WCDMA cells. The radio network controller 146 stores into a table the previous successful handovers in the desired geographical area. The user equipment 170 moves along a traffic route and is now under the coverage of the cell 206. The mobile station or the user equipment is approaching the edge of the cell 206. The network considers performing a handover and the radio network controller begins to search for the most suitable target cell. It checks the table of the previous successful handovers, the neighbor set and the mobile station's active set. On the basis of this check or comparison, the radio network controller makes a decision to transfer the mobile station from the frequency of the base station 142 to the frequency of the base station 162, which belongs to the GSM network. The radio network controller bases its decision on the assumption that if in the previous handover situation, which was with predetermined accuracy similar to the current handover situation, the cell 500 was selected, it is likely, that the same cell is the most suitable one this time, too.

The radio network controller may gather other information on the network in addition to the information on the previous successful handovers and the neighbor list. In this example, there is also another possible target cell 216, but in the light of the information on the successful handovers and the neighbor set and the active set comparison, the radio network controller chooses the cell 500. When the most suitable target cell for the handover has been found, the handover to this cell is made in block 312. This corresponds to the execution phase of the handover process. It is not explained here in further detail, because it is well known in the art and the process is described in the literature and standards.

The method ends in block 314. The arrow 316 depicts one possibility to repeat the method.

The compressed mode measurements have to be made periodically for updating statistical information, but using statistical information instead of current information reduces the amount of used resources. This is especially beneficial in jammed areas like densely used traffic routes, etc.

Figure 4:
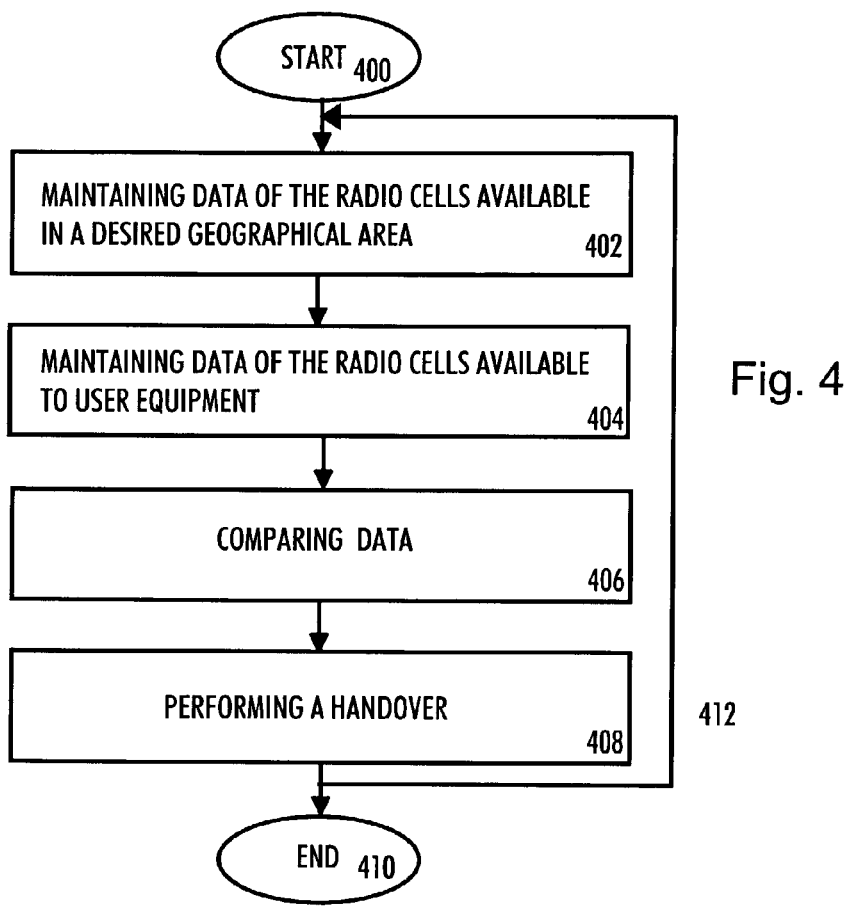
FIG. 4 is another flow chart.

Referring to FIG. 4, another preferred embodiment of the method to perform a handover without the current compressed mode measurements will be explained. The handover, which is made without the current compressed mode measurements, is here called a blind handover.

The method starts from block 400. In block 402, the data of the radio cells available in a desired geographical area is maintained. The current network of the mobile station detects whether the mobile station is located in a dual coverage area, in other words, in an area having radio coverage of the current network and of the network compatible with a different radio standard. Several methods for locating a mobile station are known in the prior art and only a few are mentioned herein.

The global positioning system GPS is the most popular radio navigation system at the moment. The principle behind GPS is that it uses precise timing within a group of satellites and transmits a spread spectrum signal to earth. An accurate clock in the receiver measures the time delay between the signals leaving the satellites and arriving at the receiver. On the basis of that, the exact distance between the observer and each satellite is calculated. When three satellites are visible, triangulation can be used to locate the observer.

Another method described here is a cellular geolocation system called CAPITAL. The CAPITAL system geolocates the target mobile station by monitoring in base stations the reverse voice-channel or reverse control-channel transmissions from the mobile user. Multiple base stations receive the mobile signal, and the target position is determined by combining the angle of arrival estimates from each base station and the time difference of arrival estimates between multiple base stations. More location methods are mentioned in the IEEE Communications Magazine, October 1996, T. S. Rappaport, J. H. Reed, B. D. Woerner: *Position Location Using Wireless Communications on Highways of the Future*, which is taken here as a reference.

In GSM and UMTS systems the serving mobile location center (SMLC) typically carriers out user equipment positioning. The SMLC selects a positioning method, control positioning measurements and calculate the position of the target. The serving mobile location center can be situated in various places: it can for instance be integrated in the base station controller or it can be a dedicated physical network element. This positioning information is preferably utilized in the embodiment of the method to make a handover without the current compressed mode measurements (blind handover) explained next.

In block 404, the data of the radio cells available to user equipment is maintained. The information on the radio cells obtainable to mobile stations comprises information that the mobile station is a dual-mode equipment, that is to say it supports both standards in question and that the mobile station can hear the signal the base station is sending in the target cell.

Next, in block 406, the data of the radio cells available in the desired geographical area is compared with the data of the radio cells available to the user equipment. This is done to find a suitable cell belonging to the other network. If it is possible to find a cell belonging to a radio system different from the user equipment's current connection system, which cell the user equipment can also hear, a handover is made in block 408. The user equipment positioning methods can be utilized in handover process. Making a handover corresponds to the execution phase of the basic handover process. It is not explained here in further detail, because it is well known in the art and the process is described in the literature and standards.

The method ends in block 410. The arrow 412 depicts one possibility to repeat the method.

Figure 6:
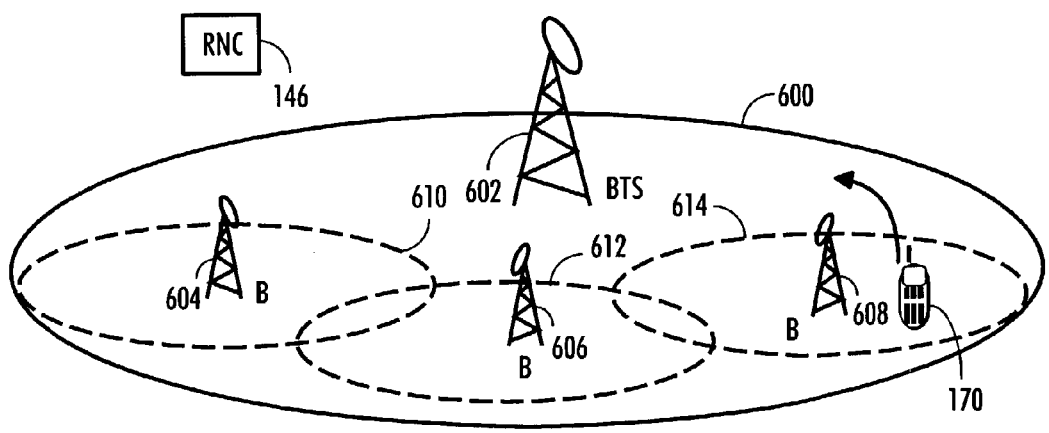
FIG. 6 illustrates another example of a handover situation.

Next, an example of one handover situation will be explained in more detail. FIG. 6 shows another simplified example of the parts of a cellular network. For example, the sizes and the number of radio cells may naturally differ from FIG. 6. The figure shows an example of an overlay-underlay network. In this example, the overlay network is a GSM network and the underlay network is a WCDMA network. The overlay network comprises the cell 600 and the underlay network comprises the cells 610, 612, 614. The user equipment or the mobile station 170 is under the coverage of the cell 614. The network notices that there is a lack of capacity in the cell 614. The network considers performing a handover and the radio network controller begins to search for the most suitable target cell. The radio network controller, RNC, finds out if there is dual coverage in the area in which the mobile station is or which it approaches. RNC also checks that the mobile station is a dual-mode mobile station. If both conditions are fulfilled, the radio network controller transfers the mobile station from the frequency of the base station 608 to the frequency of the base station 602. There are other possible target cells in the WCDMA network. The base stations of those cells are 604, 606, but this time RNC is of the opinion that it is better to transfer the mobile station into the overlay network. One reason for that decision may be that the transmission capacity limits of the cells 604, 606 are near their maximum.

One example of the system for making the aforementioned blind handovers is illustrated in FIG. 5. The radio network controller 146 collects information on previous successful handovers. This means that the radio network controller stores information on the chosen target cells when the handovers have happened. The information is typically stored into a table. Thus, the radio network controller has a list of the chosen target cells concerning the desired starting cells.

The radio network controller also has a neighbor set. The neighbor set is a list of cells a mobile station continuously measures or listens to, but whose pilot signals don't have adequate signal-to-noise ratios for a handover. This list is typically kept in the radio network controller. One or more mobile stations make the measurements and signal the results to the base stations 142, 144, 162 which then forward them to the radio network controller.

The mobile station 170 collects information in the active set, which is a list of cells whose pilot signals have strong enough signal-to-noise ratios for a handover; the mobile station can make a handover to the cells in its active set. Or, alternatively, there can be two lists: an active set of cells, which are currently used for soft handovers, and a candidate list of cells, which can be used for soft handovers, but are not used at the moment.

The radio network controller compares the active set of the mobile station and its own neighbor set to find out which neighbor set has the highest number of the same base stations as the active set of the mobile station in question. Then the radio network controller decides the target cell for a handover on the basis of the selected neighbor set and the statistical information gathered from the previous successful handovers.

The radio network controller bases its decision on the assumption, that it is likely that the same cell is also the most suitable one for the following handovers when, with predetermined accuracy, the conditions are similar to the previous handover situation. This saves resources, because the mobile stations have to make the measurements only occasionally, for instance if the topography of the network changes.

Another example of the system for performing the aforementioned blind handovers is shown in FIG. 6. The example of FIG. 6 is an overlay-underlay network. The overlay network produces the basic radio capacity in the area and the underlay network produces more capacity for densely used areas under the overlay capacity. The overlay cell 600 is usually a macro cell and the underlay cells 610, 612, 614 are micro cells. The radio network controller 146 collects the data of the radio cells available in a desired geographical area. This means that the radio network controller finds out if the mobile station is located in a dual coverage area, in other words, in an area having radio coverage of the current network and of the network compatible with a different radio standard. Several methods for locating a mobile station are known as described above.

The radio network controller also finds out if the mobile station is a dual-mode equipment, that is to say, it supports both standards in question, and if the mobile station can hear the signal the base station is sending in the target cell.

The radio network controller then compares the data of the radio cells available in the desired geographical area to the data of the radio cells available to the user equipment. This is done to find a suitable cell belonging to the overlay network. If a suitable cell is found, the radio network controller commands the mobile station to make a handover to this cell.

Figure 7:
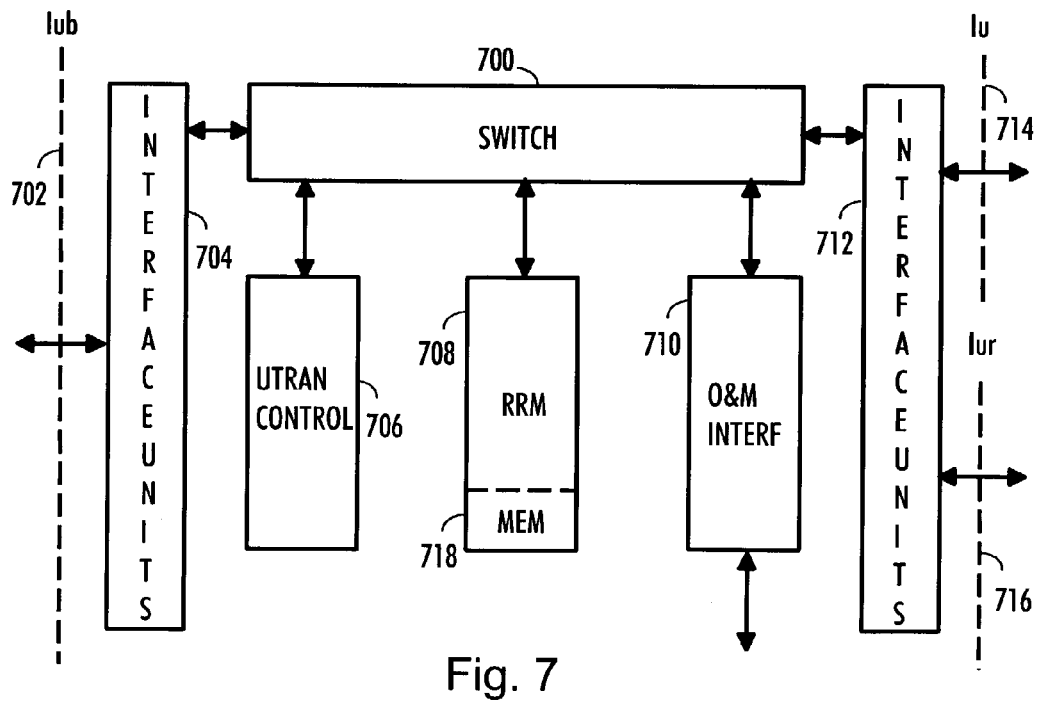
FIG. 7 shows an example of a radio network controller.

Referring to FIG. 7, a simplified block diagram illustrates an example of a radio network controller's logical structure. RNC is, as mentioned above, the switching and controlling element of UTRAN. The switching 700 takes care of the connection between the core network and the user equipment. The radio network controller is located between the Iub 702 and Iu 714 interfaces. The network controller in connected to these interfaces via interface units 704, 712. There is also an interface for inter-RNC transmission called Iur 716. The precise implementation of the radio network controller is vendor-dependent.

The functionality of the radio network controller can be classified into two classes: UTRAN radio resource management 708 and control functions 706. An operation and management interface function 710 serves as a medium for information transfer to and from network management functions. The radio resource management is a group of algorithms used to share and manage the radio path connection so that the quality and capacity of the connection are adequate. The most important radio resource management algorithms are handover control, power control, admission control, packet scheduling, and code management. The UTRAN control functions take care of functions related to the set-up, maintenance and release of a radio connection between the base stations and user equipment.

The radio network controller performs the actions needed in the handover. Most of them belong to the radio resource management functions. The information on the previous successful handovers of a desired geographical area and maintaining the data of the radio cells available in a desired geographical area are in this example stored into the memory belonging to the radio resource management functions 718. The radio resource management functions also carry out the comparing of the data of the radio cells available in the desired geographical area with the data of the radio cells available to the user equipment and the selecting of the most suitable target cell for a handover. After the target cell selection is made, the radio resource management functions, UTRAN control functions, switching and interface units produce the handover command to the mobile station.

The radio resource management often comprises user equipment positioning which is a task of the serving mobile location center (SMLC). The SMLC selects a positioning method, control positioning measurements and calculate the position of the target.

The disclosed functionalities of the preferred embodiments of the invention can be advantageously implemented by means of software in the mobile station and the different parts of the data transmission system, mostly in the radio network controller.

Although the invention is described above with reference to an example according to the accompanying drawings, it is obvious that the invention is not restricted to it but may be varied in many ways within the inventive idea disclosed in the accompanying claims.

We claim:

1. A handover method in a telecommunication system, the method comprising:
    storing information on the previous successful handovers of a desired geographical area,
    maintaining the data of the radio cells available in a desired geographical area,
    maintaining the data of the radio cells available to user equipment,
    comparing the data of the radio cells available in the desired geographical area with the data of the radio cells available to the user equipment,
    selecting the most suitable target cell for a handover on the basis of the results of the comparison between the data of the radio cells available in the desired geographical area and the data of the radio cells available to the user equipment and the information on the previous successful handovers,
    performing a handover.

2. The method of claim 1, wherein the data of the radio cells available or obtainable in the desired or determined geographical area is maintained by measurements made by another mobile station.

3. The method of claim 1, wherein the data of the radio cells available or obtainable in the desired or determined geographical area is maintained with the aid of a neighbor set.

4. The method of claim 1, wherein the data of the radio cells available to the user equipment is maintained with the aid of an active set.

5. The method of claim 1, wherein the data of the radio cells available to the user equipment is maintained by measurements made by another mobile station.

6. The method of claim 1, wherein the geographical position of the user equipment is determined by a locationing method.

7. A handover method in a telecommunication system, the method comprising:
    storing information on the previous successful handovers of a determined geographical area,
    acquiring and storing the data of the radio cells obtainable in the determined geographical area,
    acquiring and storing the data of the radio cells obtainable to user equipment,
    comparing the data of the radio cells obtainable in the determined geographical area with the data of the radio cells obtainable to the user equipment and selecting the most suitable target cell for a handover on the basis of the results of the comparison and the stored information on the previous successful handovers,
    performing a handover.

8. A telecommunication system, comprising:
    means for storing information on the previous successful handovers of a desired geographical area,
    means for maintaining the data of the radio cells available in a desired geographical area,
    means for maintaining the data of the radio cells available to user equipment,
    means for comparing the data of the radio cells available in the desired geographical area with the data of the radio cells available to the user equipment,
    means for selecting the most suitable target cell for a handover on the basis of the results of the comparison between the data of the radio cells available in the desired geographical area and the data of the radio cells available to the user equipment and the information on the previous successful handovers,
    means for performing a handover.

9. The system of claim 8, wherein the data of the radio cells available or obtainable in the desired or determined geographical area is maintained by measurements made by another mobile station.

10. The system of claim 8, wherein the data of the radio cells available or obtainable in the desired or determined geographical area is maintained with the aid of a neighbor set.

11. The system of claim 8, wherein the data of the radio cells available to the user equipment is maintained with the aid of an active set.

12. The system of claim 8, wherein the data of the radio cells available to the user equipment is maintained by measurements made by another mobile station.

13. The system of claim 8, wherein the geographical position of the user equipment is determined by a locationing method.

14. A telecommunication system, comprising:
    means for storing information on the previous successful handovers of a determined geographical area,
    means for acquiring and storing the data of the radio cells obtainable in a determined geographical area, means for acquiring and storing the data of the radio cells obtainable to user equipment, means for comparing the data of the radio cells obtainable in the determined geographical area with the data of the radio cells obtainable to the user equipment and for selecting the most suitable target cell for a handover on the basis of the results of the comparison and the stored information on the previous successful handovers, means for performing a handover.

15. A telecommunication system which is configured to
store information on the previous successful handovers of a desired geographical area,
maintain the data of the radio cells available in the desired geographical area,
maintain the data of the radio cells available to user equipment,
compare the data of the radio cells available in the desired geographical area with the data of the radio cells available to the user equipment,
select the most suitable target cell for a handover on the basis of the results of the comparison between the data of the radio cells available in the desired geographical area and the data of the radio cells available to the user equipment and the information on the previous successful handovers,
perform a handover.

16. A telecommunication system which is configured to
store information on the previous successful handovers of a determined geographical area,
acquire and store the data of the radio cells obtainable in the determined geographical area,
acquire and store the data of the radio cells obtainable to user equipment,
compare the data of the radio cells obtainable in the determined geographical area with the data of the radio cells obtainable to the user equipment and to select the most suitable target cell for a handover on the basis of the results of the comparison and the stored information on the previous successful handovers,
perform a handover.

17. A radio network controller, comprising:
means for storing information on the previous successful handovers of a desired geographical area,
means for maintaining the data of the radio cells available in the desired geographical area,
means for receiving the data of the radio cells available to user equipment,
means for comparing the data of the radio cells available in the desired geographical area with the data of the radio cells available to the user equipment,
means for selecting the most suitable target cell for a handover on the basis of the results of the comparison between the data of the radio cells available in the desired geographical area and the data of the radio cells available to the user equipment and the information on the previous successful handovers,
means for commanding the user equipment to perform a handover.

18. The controller of claim 17 which is arranged to maintain the data of the radio cells available in the desired geographical area with the aid of a neighbor set.

19. The controller of claim 17 which is arranged to maintain the data of the radio cells available to the user equipment by measurements made by another mobile station.

20. A radio network controller, configured to:
store information on the previous successful handovers of a desired geographical area,
maintain the data of the radio cells available in the desired geographical area,
receive the data of the radio cells available to user equipment,
compare the data of the radio cells available in the desired geographical area with the data of the radio cells available to the user equipment,
select the most suitable target cell for a handover on the basis of the results of the comparison between the data of the radio cells available in the desired geographical area and the data of the radio cells available to the user equipment and the information on the previous successful handovers, and
command the user equipment to perform a handover.

* * * * *